(12) United States Patent
Chou (10) Patent No.: US 7,418,004 B2
(45) Date of Patent: Aug. 26, 2008

(54) MEDIUM ACCESS CONTROL METHODS WITH QUALITY OF SERVICE AND POWER MANAGEMENT FOR WIRELESS LOCAL AREA NETWORKS

(75) Inventor: Zi-Tsan Chou, Taipei (TW)

(73) Assignee: Institute for Information Industry, Taepai (TW)

( * ) Notice: Subject to any disclaimer, the term of this patent is extended or adjusted under 35 U.S.C. 154(b) by 577 days.

(21) Appl. No.: 11/022,866

(22) Filed: Dec. 28, 2004

(65) Prior Publication Data

US 2006/0062181 A1 Mar. 23, 2006

(30) Foreign Application Priority Data

Sep. 23, 2004 (TW) .............................. 93128860 A (51) Int. Cl.
*H04L 12/403* (2006.01)
(52) U.S. Cl. .................. 370/449; 370/338; 370/346; 370/445; 370/458; 455/435.1; 455/509
(58) Field of Classification Search ................ 370/311, 370/338, 449, 458, 329, 331; 455/435.1, 455/509
See application file for complete search history.

(56) References Cited

U.S. PATENT DOCUMENTS

| | | | |
|---|---|---|---|
| 2002/0163928 A1* | 11/2002 | Rudnick et al. | 370/444 |
| 2004/0156351 A1* | 8/2004 | Kim | 370/349 |
| 2005/0047386 A1* | 3/2005 | Yi | 370/345 |

\* cited by examiner

*Primary Examiner*—Duc Nguyen
*Assistant Examiner*—Aung T Win
(74) *Attorney, Agent, or Firm*—Bacon & Thomas, PLLC (57) ABSTRACT

A MAC method has three procedures: a prioritization procedure, a collision resolution procedure, and a polling procedure. The prioritization procedure employs the handshaking method to ensure that a high priority station can join the polling list earlier than a low priority station. The collision resolution procedure employs a tree-splitting algorithm to ensure all active stations that underwent the prioritization period can join the polling list in a bounded time. In the polling procedure, the AP allocates the TXOP for each admitted station and schedules the transmission order of all admitted stations. In addition, the AP broadcasts the schedule information in the V-POLL frame. A power-saving station can wake up at the start of the contention-free period. To conserve power, on inspecting the V-POLL frame, if a PS station finds that it cannot transmit nor receive data frames during the polling period, then that station may return to the doze state.

13 Claims, 10 Drawing Sheets

MEDIUM ACCESS CONTROL METHODS WITH QUALITY OF SERVICE AND POWER MANAGEMENT FOR WIRELESS LOCAL AREA NETWORKS

BACKGROUND OF THE INVENTION

1. Field of the Invention

The present invention relates to medium access control (MAC) methods for wireless local area networks (WLANs). Specifically, the invention provides prioritization, time-bounded reservation, dynamic channel time allocation, admission control, and power management mechanisms to support applications with power saving and quality of service (QoS) requirements.

2. Description of Related Art

With the proliferation of portable devices and the advance of channel modulation techniques, there has been growing interest in providing QoS guarantees for multimedia applications over WLANs. A WLAN typically consists of an access point (AP) and a finite number of mobile stations (or called stations), such as wireless phones or laptops. On the other hand, mobile stations are often operated by batteries. It is well known that, due to technology limitations, the battery capacity will not be dramatically improved in the not-so-distant future. Hence it is important to design a MAC method with QoS and power saving support.

The international MAC standard for WLAN, IEEE 802.11, defines two modes of operation: distributed coordination function (DCF) and point coordination function (PCF). DCF employs carrier sense multiple access with collision avoidance (CSMA/CA) in the contention period (CP) for asynchronous data transfer. PCF employs the polling scheme during the contention-free period (CFP) to provide isochronous transmission services. In 802.11, PCF uses a point coordinator (PC), which should operate at the AP, to determine which station on the polling list currently has the right to transmit. When an AP/PC is operating in a WLAN, the two coordination functions alternate, with a CFP followed by a CP, which we will collectively refer to as a CFP repetition interval or a superframe. For a complete and detailed description, please refer to the IEEE 802.11 specification (IEEE Standard 802.11-1999, Wireless LAN Medium Access Control (MAC) and Physical Layer (PHY) Specifications. IEEE, November 1999).

Although PCF can provide contention-free transmission, there are several problems with PCF that make it less attractive for QoS and power conservation. (i) Any station intending to receive contention-free service should first send the (re)association frame to the AP during the CP. Since DCF is governed by a contention-based DCF, the (re)association frames need to compete with all other stations in the same cell, resulting in an unbounded (re)association delay. Hence a real-time station with bad luck may never get on the polling list. (ii) Since DCF does not support traffic prioritization, so a low priority station may join the polling list earlier and faster than a high priority station. (iii) IEEE 802.11 does not allow a station to send frames directly to any other stations within the same infrastructure WLAN, and instead the AP should relay the frames always. In this way, the bandwidth is indeed consumed twice than directional communication between stations. (iv) During the CFP, the transmission time of a polled station is unpredictable and unrestrained. Any polled station is allowed to send a single frame that may be of an arbitrary length, up to the maximum of 2304 bytes (or 2312 bytes when the frame body is encrypted using WEP). This may adversely degrade and ruin the performance of the other stations on the polling list. (v) Since PCF has no admission control, the PC may admit a large number of real-time stations. Under the circumstances, several pollable stations may not receive a poll or the data from the PC during the entire CFP, thus incurring unnecessary awakeness and energy expense. (vi) When a pollable station wants to leave the polling list, it should reassociate with the AP via DCF. The station without additional buffered data but having no chance to get off the polling list will respond with a Null frame when polled by the AP. These Null frames are simply a wastage of bandwidth, thus causing the PCF performance down.

To accommodate additional QoS provision, IEEE 802.11e draft (IEEE 802.11e/D6.0, Draft Supplement to Part 11: Wireless Medium Access Control (MAC) and physical layer (PHY) specifications: Medium Access Control (MAC) Enhancements for Quality of Service (QoS), 2003) proposes a new coordination function, called HCF (hybrid coordination function). The HCF defines two channel access mechanisms: EDCA (enhanced distributed channel access) and HCCA (HCF controlled channel access). Especially, the EDCA introduces a new type of IFS (Inter Frame Space), named AIFS (Arbitration IFS), for different access categories. Since the AIFS values are longer than DIFS, the frame of a station using the existing DCF may take priority over that of a QoS-aware station using EDCA. In EDCA, the minimum and maximum values of the contention windows (CWs) of a high-priority station are smaller than those of a low-priority station, where CWmin denotes the smallest contention window and CWmax denotes the largest contention window. However, EDCA may suffer from the priority reversal problem; that is, a lower-priority station may take priority over a higher-priority station. Such a priority reversal phenomenon may discourage customers from buying high-priority WLAN services. We accordingly invent new MAC methods which can conquer the above-mentioned problems, coexist with DCF, and provide power saving and QoS guarantees to wireless multimedia applications as well.

SUMMARY OF THE INVENTION

The objective of the invention is to provide medium access control (MAC) methods for a wireless local area network (WLAN). Specifically, the present invention provides prioritization, time-bounded reservation, dynamic channel time allocation, run-time admission control, and power management mechanisms to support applications with power saving and quality of service (QoS) requirements.

The basic building block of the WLAN is the cell, also known as the basic service set (BSS) defined in IEEE 802.11 specification. A BSS is composed of a central base station, known as an access point (AP), and a finite set of mobile stations (or called stations) such as wireless phones, laptops, or other devices with wireless communication functions. Mobile stations can operate either in the active mode or the power-saving (PS) mode. In IEEE 802.11, a station should associate with an AP (or reassociate with a new AP) to become a member of an infrastructure BSS. When the association request is granted, the AP responds with a status code of 0 (successful) and the Association ID (AID). The AID is an integer identifier used to logically identify the mobile station. The AP can thus maintain a list of finite stations associated within its BSS and updates it whenever a new station joins or a station leaves the BSS. However, the present invention allows the AP or mobile stations to disable the CF-Pollable and CF-Poll Request subfields of the Capacity Information field in (re)association request frames. Instead, the invention provides a new reservation method such that stations are able to get on/off the polling list quickly and efficiently without relying on the (re)association.

The present invention is used in the contention-free period (CFP). At the nominal start of each CFP, known as the TBTT (target beacon transmission time), power-saving (PS) stations may wake up and remain active to listen for the vector-list poll (V-POLL) frame; meanwhile, the AP continuously monitors the channel and then seizes its control by transmitting a beacon frame after the PIFS (priority inter frame space) medium idle time. One component of the beacon announcement is the maximum duration of the CFP, CFPMaxDuration. Every station receiving the beacon should update its NAV (network allocation vector) to the CFPMaxDuration. This NAV is used for preventing a DCF-based station from taking control of the medium during the CFP.

Figure 2:
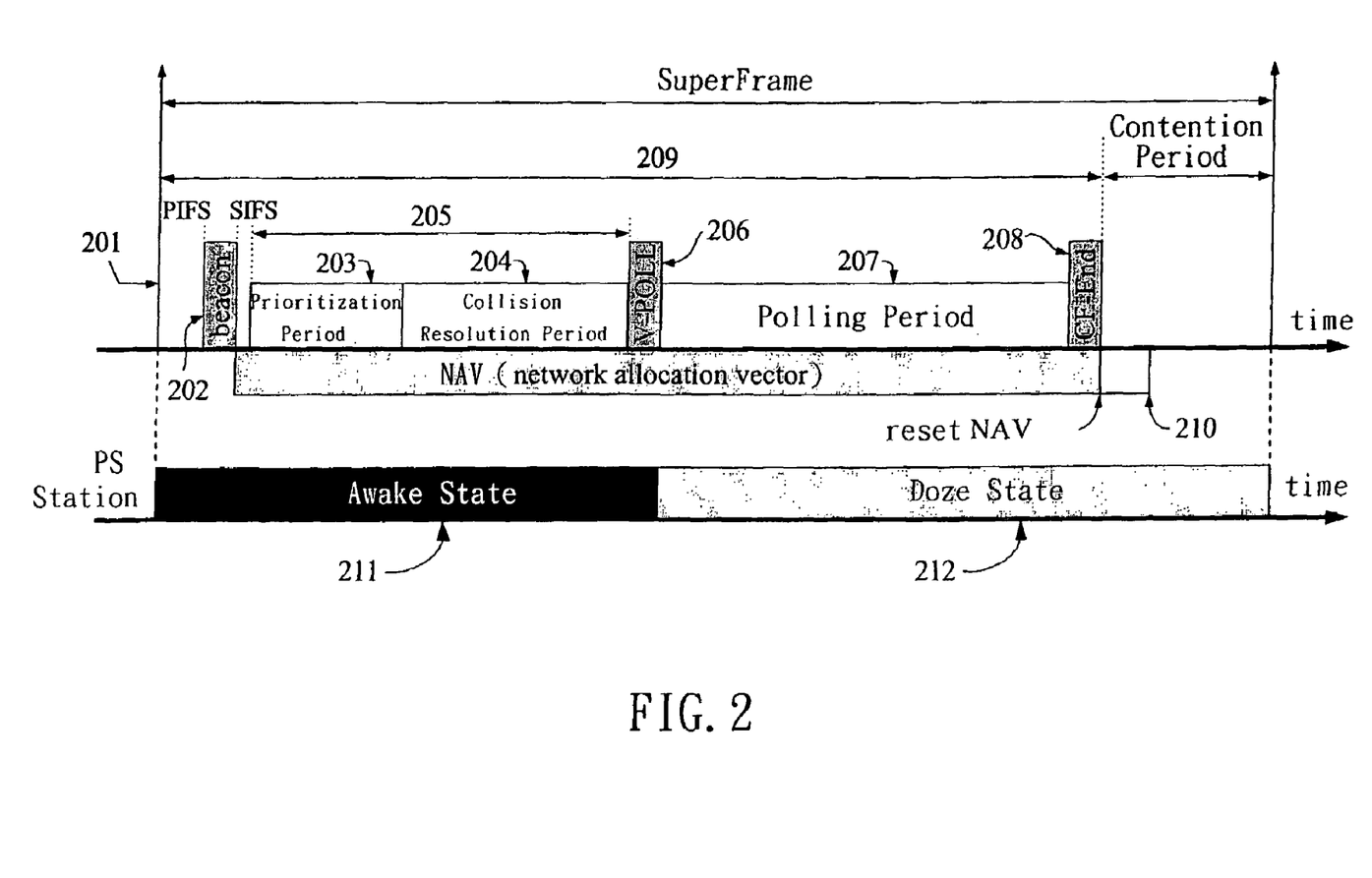
FIG. 2 is an example of a superframe structure and the awake/doze state switching of a power saving station according to an embodiment of the invention.

In the present invention, as depicted in FIG. 2, the CFP is further divided into three periods: the prioritization period, the collision resolution period, and the polling period. The first two periods are together called the registration period. During the prioritization period, the AP performs a series of handshakes to guarantee that high-priority stations are always admitted to the polling list earlier than low-priority stations. During the collision resolution period, the AP performs a deterministic tree-splitting algorithm to probe which stations undergo the prioritization period desire to join the polling list. Once the registration process terminates, the AP broadcasts a V-POLL frame to announce the start of the polling period. The V-POLL frame contains a vector list and each vector is composed of a yet-to-be-polled station, its intended receiver, and the granted TXOP. Upon examining the V-POLL frame, a PS station that can be neither a sender nor a receiver during the polling period may reenter to the doze state. Note that, in the doze state, a station is unable to transmit or receive but consumes very low power. After the end of the polling period, the PC broadcasts the CF-End frame to let all stations reset their NAV and enter the CP. Since the length of CFPMaxDuration is limited, the overrun of the registration process may shorten the polling period, thus violating the quality of already-admitted connections. Hence a new run-time admission control method is invented to assist the AP in determining when the registration period should be terminated. In particular, when the polling list size reaches saturation point, the AP may directly dive into polling period at the start of the CFP without first performing the registration procedure. A surprising phenomenon in VPCF is that collisions may occur in the CFP. However, during the entire CFP, associated stations can transmit frames only when they are allowed to do so by the AP. Consequently, the AP can control these collisions effectively and without chaotic events.

A data frame or a flow typically has a priority. For example, a voice flow generally has a higher priority than a video flow. In the invention, priority levels are numbered from 0 to H, with H denoting the highest priority level. A frame with priority 0 can be sent via the DCF. On the other hand, the active station that has a flow with priority level ranging from 1 to H can participate in the registration process. Note that, in the invention, a station is "active" if that station desires to get on the polling list.

After broadcasting a beacon and waiting for a SIFS (short inter frame space) period, the AP sends the control frame $PE_H$ (priority enquiry) to invite active stations whose priority equals H to reply the PR (priority response) frame. On receiving the $PE_H$ frame, an active station with priority level H should acknowledge a PR frame after a SIFS period. At the end of the handshake, the AP can obtain the ternary feedback information from stations' responses: (i) IDLE: The PC does not receive any PR frames. (ii) SINGLE: The PC successfully receives a single PR MAC frame which includes the sender AID and the destination MAC address. That AID will be placed on the polling list. (iii) COLLISION: This event occurs if the outcome of the handshake is neither IDLE nor SINGLE.

If the conclusion of the current handshake is IDLE (SINGLE, respectively), the PC may proceed to the next handshake by issuing the $PE_{H-1}$ frame after an elapsed PIFS (SIFS, respectively). The priority probing process keeps running until the occurrence of a COLLISION, the delivery of the $PE_1$ frame, or a failure in the run-time admission test, whichever comes first. Especially, once the AP recognizes a COLLISION event, it will send an RE (registration enquiry) frame to announce the start of the collision resolution period. During the collision resolution period, the AP executes the collision resolution procedure to discover which active stations bring the COLLISION event. The prioritization operation is essentially that of polling, with the AP polling each of the priority groups in a descending order.

Figure 6:
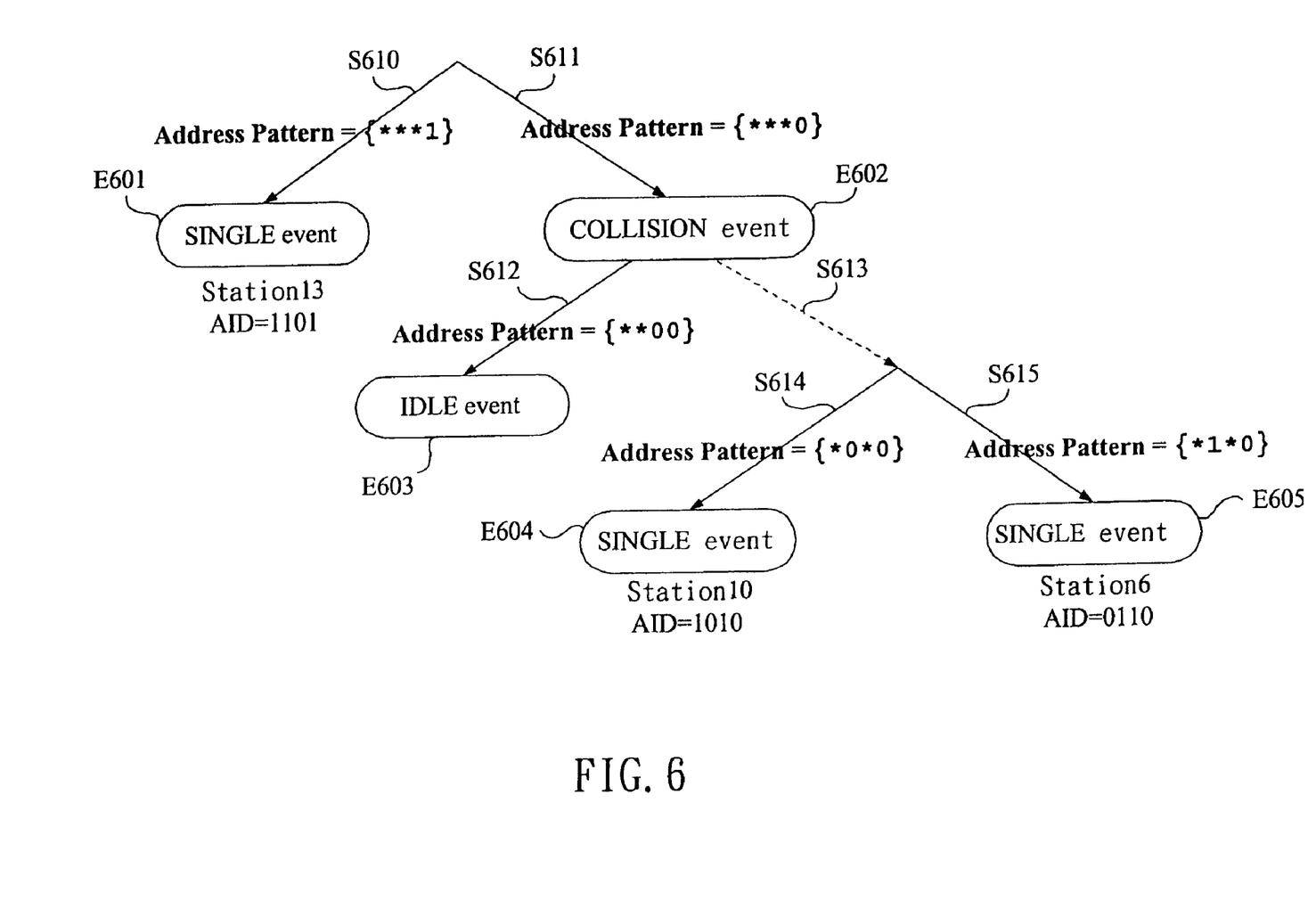
FIG. 6 is a schematic graph of a tree-splitting algorithm according to an embodiment of the invention.
Figure 7:
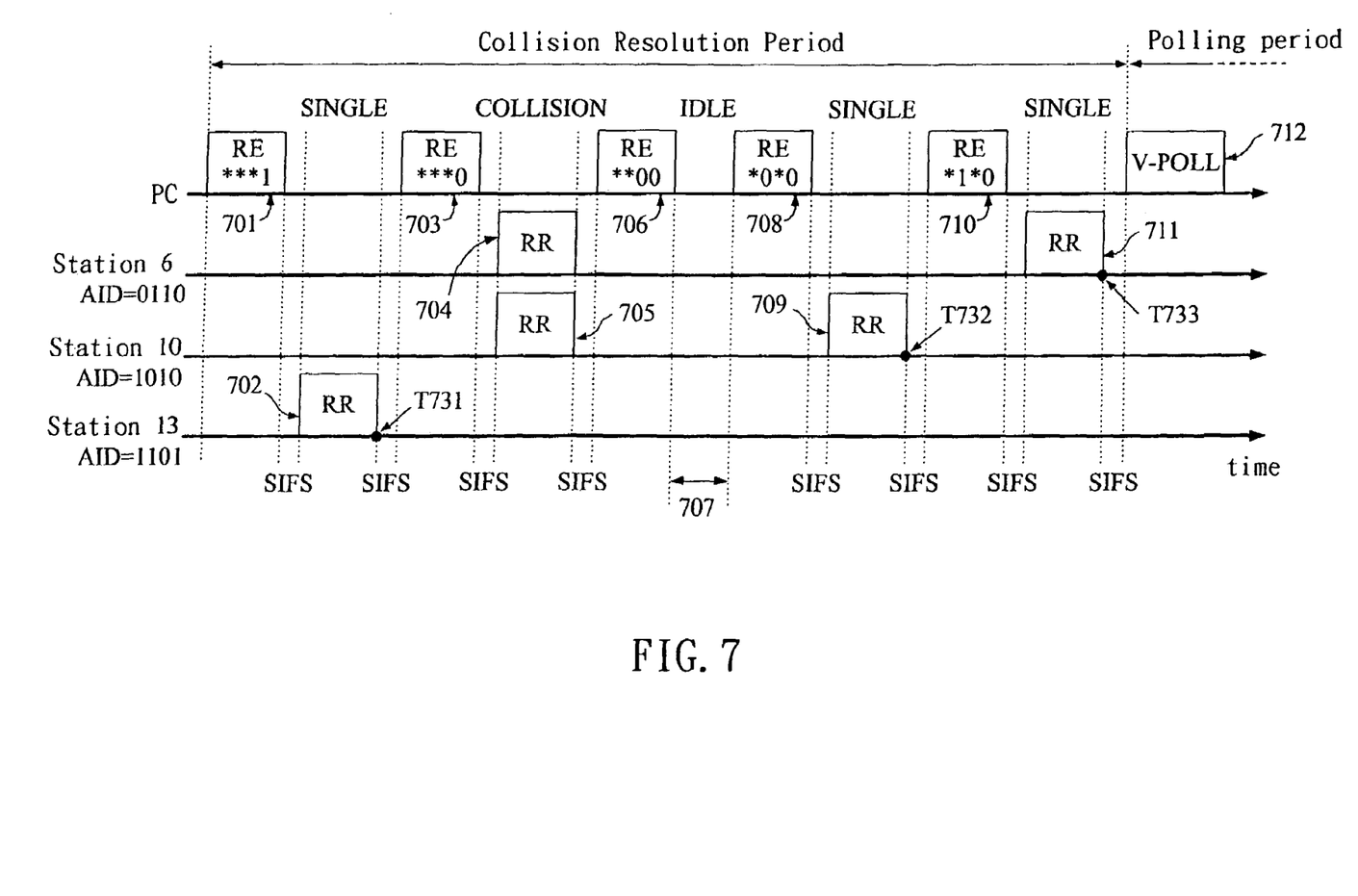
FIG. 7 is an example of a collision resolution procedure according to an embodiment of the invention.

Once the prioritization period ends up with a COLLISION event, the AP will execute a collision resolution procedure, called tree-splitting algorithm, to probe which contending stations intend to get on the polling list. The basic idea of the tree-splitting algorithm is that once a COLLISION occurs, the AP randomly splits the set P of stations involved in the collision into two subsets, P1 and P2. The AP first recursively resolves the collision of P1, and then resolves the collision of P2 independently. FIG. 6 and FIG. 7 show how the tree-splitting procedure works. Assume that H=3 and there are 15 associated stations in a BSS. Besides, stations 4, 6, 10, and 13 intend to join the polling list. At the beginning of the collision resolution period, the AP sends the RE frame to ask active stations with their AIDs in the address pattern range of {*1} to reply the registration response (RR) frame, wherein {*1} indicates a binary set containing {0001, 0011, 0101, 0111, 1001, 1011, 1101, 1111} and * means "don't care." Suppose that only the station with AID=13 (1101 in binary) (briefly, station 13) replies the RR frame, then station 13 is successfully added in the polling list. Next, AP sends out the RE frame with address pattern={*0}, asking for responses. Since both the AIDs of stations 6 and 10 belong to {*0}, then they reply, and their replies collide. Thus, the AP reduces the address pattern range to a half as {00}. This time, the AP will discover an IDLE event. However, it may be pointless for the AP to further probe the range of {10} since it is predictable to have a COLLISION event. Continuing in this manner, the AP is able to discover the active stations which bring the COLLISION in the prioritization period in bounded time. From FIG. 7, it can be found that stations 13, 10, and 6 join the polling list at time T731, T732, and T733, respectively.

When the collision resolution procedure is over, the AP broadcasts the V-POLL frame to announce the start of the polling period. The V-POLL frame contains a list of vectors, and each vector contains: (1) the AID of an admitted station (that is, the station in the polling list), (2) the receiver AID, and (3) the transmission opportunity (TXOP) for that admitted station.

In the invention, if a power-saving (PS) station finds that its AID is not in the V-POLL frame, then that PS station can return to the doze state. On the other hand, each polled station needs to keep track of the channel activity and automatically initiates its transmission a SIFS period after the end of the transmission of its predecessor in the polling order. To conserve energy, a PS station that will be either a sender or a receiver during the polling period may remain in the awake state for only a portion of the polling period through the time that the PS station finishes sending or receiving data frames. To minimize the average time spent awake, in the invention, the AP adopts the shortest-job-first policy proposed to schedule the poll records, wherein the job size corresponds to the aggregate TXOP.

The invention can support the transportation of multimedia traffic. Multimedia flows are in general classified into two types: constant bit rate (CBR) and variable bit rate (VBR). In the invention, during the registration period, each active station informs the AP the value of gTXOP and the value of dTXOP needed in the current CFP. In addition, each polled station can piggyback the dTXOP value with the data frame to declare its required TXOP in the next polling period. In the invention, the AP will allocate the proper TXOP value for each polled station according to its proposed values of dTXOP and gTXOP. The AP will guarantee that each admitted station, say station Ai, can obtain the default TXOP value (i.e. min{dTXOP_Ai, gTXOP_Ai}), wherein gTXOP_Ai denotes the gTXOP announced by station Ai, and min{dTXOP_Ai, gTXOP_Ai} denotes the minimum value between dTXOP_Ai and gTXOP_Ai. Before sending the V-POLL frame, the AP should compute the remaining available channel time (RACT) in the CFP after allocating the default TXOP to each admitted station. If RACT is still greater than zero, then the AP will allocate that RACT to all stations whose dTXOP is greater than gTXOP.

Since the length of the contention-free period is limited (no more than CFPMaxDuration), the AP should persist in monitoring the medium access activities and determine when to terminate the registration process in order not to violate the guarantees of the default TXOP values made to admitted stations. In other words, the overrun of the registration process may shorten the polling period, hence violating the quality of already-admitted flows. Conventional admission control methods often require that the mobile station proposes its QoS requirement when making a reservation, and then the AP executes the admission test to decide whether to accept/reject that connection request according to available resources. However, such a traditional approach is not suitable for the present invention in that the reservation request/response frame exchange failing the admission test simply wastes the scarce radio bandwidth. Instead, the invention integrates the run-time admission control mechanism into the registration process. Specifically, during the registration period, the AP computes the RACT based on the default TXOP reserved for all admitted stations, and then piggybacks the available channel time information with the PE/RE frame. Upon receipt of the PE/RE frame, active stations take the admission test, that is, check whether the RACT is sufficient to meet their needs. The active stations that pass the admission test can reply the PR/RR frames and report their TXOP needs; while the active stations that fail the admission test can either adjust their TXOP needs or abort the contention in the remaining registration period and wait for the next CFP.

In summary, as compared to the prior methods (802.11 standard and 802.11e draft), the invention has the following advantages:

(1) The invention employs the handshaking method to support the multiple priorities and guarantee that a high priority station can join the polling list earlier than a low priority station, which cannot be achieved by 802.11 standard and 802.11e draft.

(2) The invention employs the tree-splitting algorithm to ensure that active stations which underwent the prioritization period can join the polling list in bounded time. Also, this feature cannot be achieved by 802.11 standard and 802.1e draft.

(3) In the invention, the AP allocates the proper TXOP to each polled station according to its declared dTXOP and gTXOP. By this way, the invention can provide per-flow probabilistic performance assurances.

(4) Since the length of the contention-free period is limited, the invention integrates the run-time admission control mechanism into the registration process such that the AP can admit as many newly arriving flows as possible, while not violating already-admitted flows' guarantees.

(5) The invention achieves power conservation via the following three approaches: (a) in contrast with contention MAC protocols (e.g., the DCF in 802.11 or the EDCA in 802.11e), the invention adopts the reservation and polling access methods to reduce unnecessary collisions and retransmissions as far as possible; (b) the invention uses the V-POLL frame to let power-saving (PS) stations which cannot partake in the polling process immediately return to the doze state; (c) the invention employs the power-conserving scheduling algorithm such that PS stations which will partake in the polling process can spend as little awake time as possible.

(6) The invention may be compatible concurrently with the IEEE 802.11 DCF and the IEEE 802.11e HCF, as being independent of any medium access mechanisms operating in the contention period.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
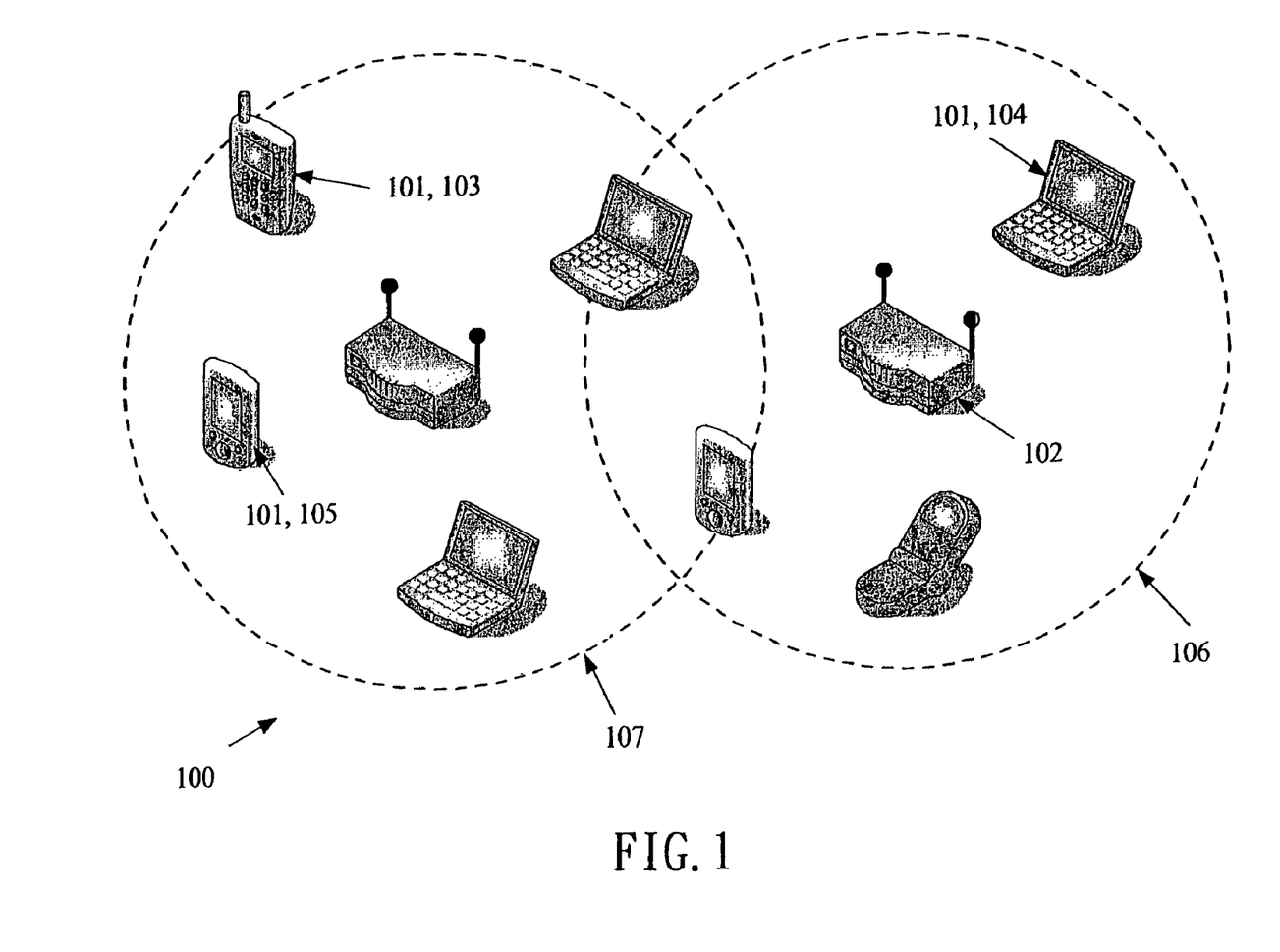
FIG. 1 is a configuration of a wireless local area network (WLAN) according to an embodiment of the invention.

FIG. 1 shows a configuration of a wireless area network (WLAN) 100 consisting of two basic service sets (BBSs). In FIG. 1, the BSS 106 includes an AP 102 and a finite number of mobile stations (or stations, for short) 101, such as wireless phones 103, PDAs 105, laptops 104, or other devices with wireless interfaces. Each station can operate either in the active mode or power-saving (PS) mode. A station in the PS mode is referred to as a PS station. A PS station can save the power consumption by switching to the doze state. Each station should associate with an AP (or reassociate with a new AP) to become a member of an infrastructure BSS. When the association request is granted, the AP responds with a status code of 0 (successful) and the Association ID (AID). The AID is an integer identifier used to logically identify the mobile station within the BSS. On the other hand, a data frame or a flow typically has a priority. For example, a voice flow generated by the wireless phone 103 may take priority over a video flow generated by the laptop 104. The invented medium access control (MAC) methods are built on the top of the 802.11 DCF to provide prioritized and parameterized QoS services. The invention and DCF can coexist in a manner that permits both to operate concurrently within the same BSS. Referring to FIG. 2, the AP in a BSS takes charge of the alternation of a contention-free period 209 and a contention period, which constitute a superframe. FIG. 2 shows an example of a superframe structure and the awake/doze state switching of a PS station. The invented MAC methods are used in the contention-free period.

Referring again to FIG. 2, at the nominal start of each CFP, also known as the TBTT (target beacon transmission time) 201, PS stations can wake up and remain in the awake state 211 to listen for the V-POLL frame; meanwhile, the AP continuously monitors the channel and then seizes its control by broadcasting a beacon frame 202 after the PIFS medium idle time. One component of the beacon announcement is the maximum duration of the CFP, CFPMaxDuration. Every station receiving the beacon should update its NAV (network allocation vector) to the CFPMaxDuration. This NAV is used for preventing a DCF-based station from taking control of the medium during the CFP. Besides, during the CFP, any station cannot send frames unless it is polled by the AP. In the invention, the CFP is further divided into three periods: the prioritization period 203, the collision resolution period 204, and the polling period 207. The first two periods are together called the registration period 205.

Figure 3:
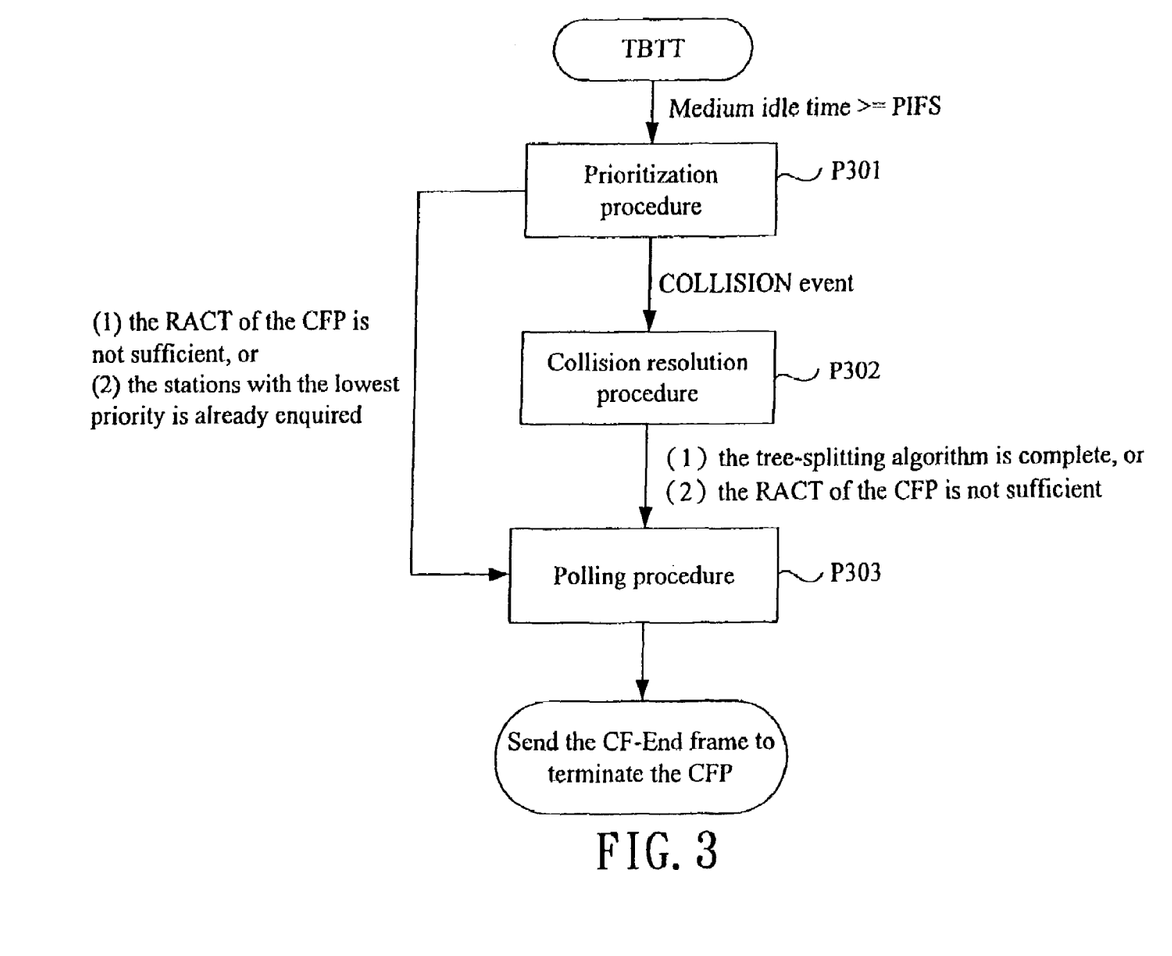
FIG. 3 is a flowchart of FIG. 2 according to an embodiment of the invention.

Referring to FIGS. 2 and 3, the prioritization procedure P301 is executed in the prioritization period, the collision resolution procedure P302 is executed in the collision resolution period, and the polling procedure P303 is executed in the polling period. The registration procedure is composed of the prioritization procedure and the collision resolution procedure. During the prioritization period 203, the AP performs a series of handshakes to guarantee that high-priority stations are always admitted to the polling list earlier than low-priority stations. During the collision resolution period 204, the AP performs a series of handshakes (called the tree-splitting algorithm) to let active stations that underwent the prioritization period join the polling list in bounded time. At the start of the polling period, the AP broadcasts a V-POLL frame 206 to specify the access order and the channel time (TXOP) for each polled station. The V-POLL frame contains the vector list and each vector is composed of at least the yet-to-be-polled station, its intended receiver, and the granted TXOP. Upon examining the V-POLL frame 206, if a PS station finds that its AID is not in the V-POLL frame, then that PS station may switch to the doze state. After the end of the polling period, the AP sends the CF-End frame 208 to let all stations reset their NAV and enter the CP.

Figure 4:
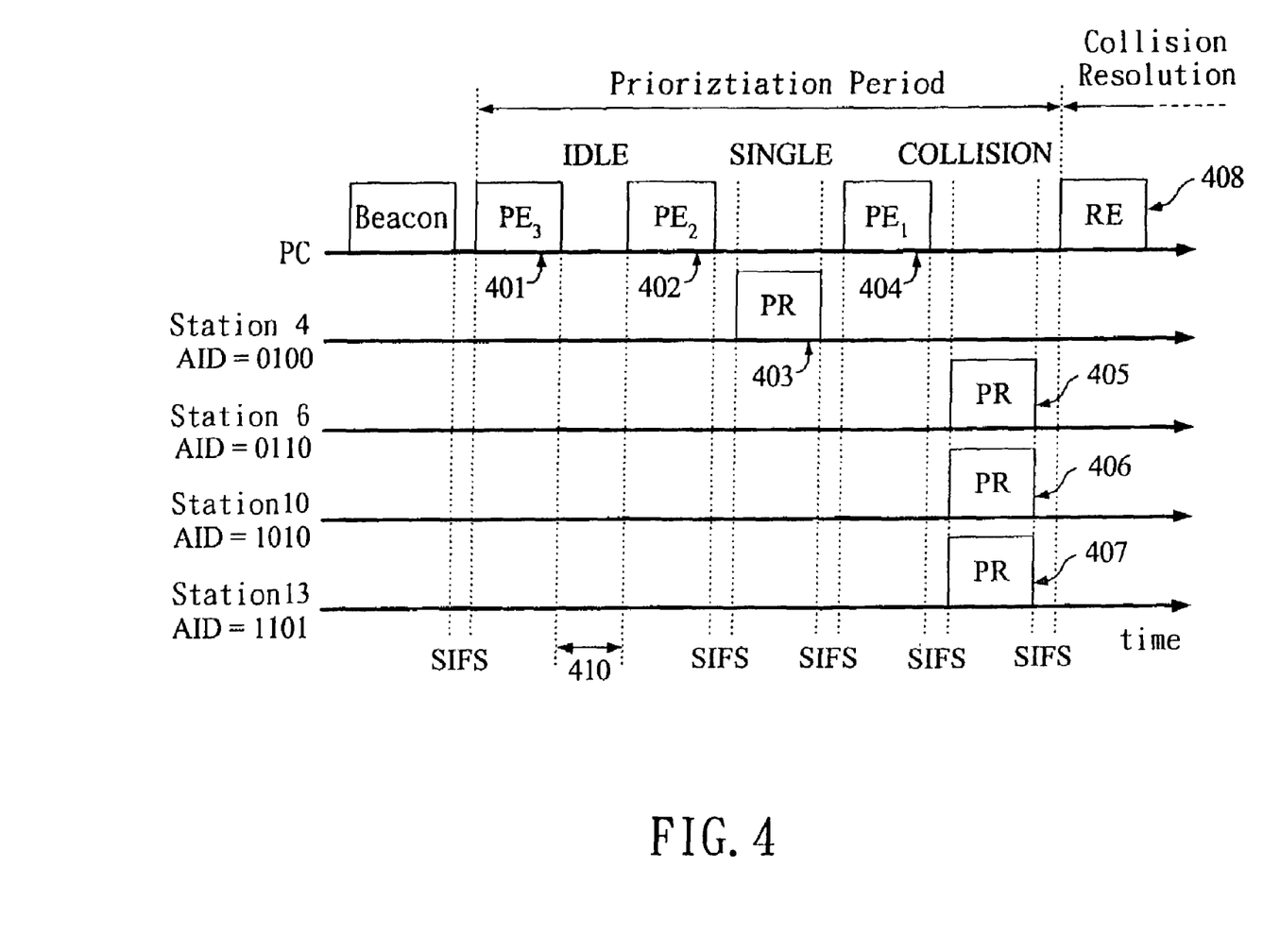
FIG. 4 is an example of a prioritization procedure according to an embodiment of the invention.
Figure 5:
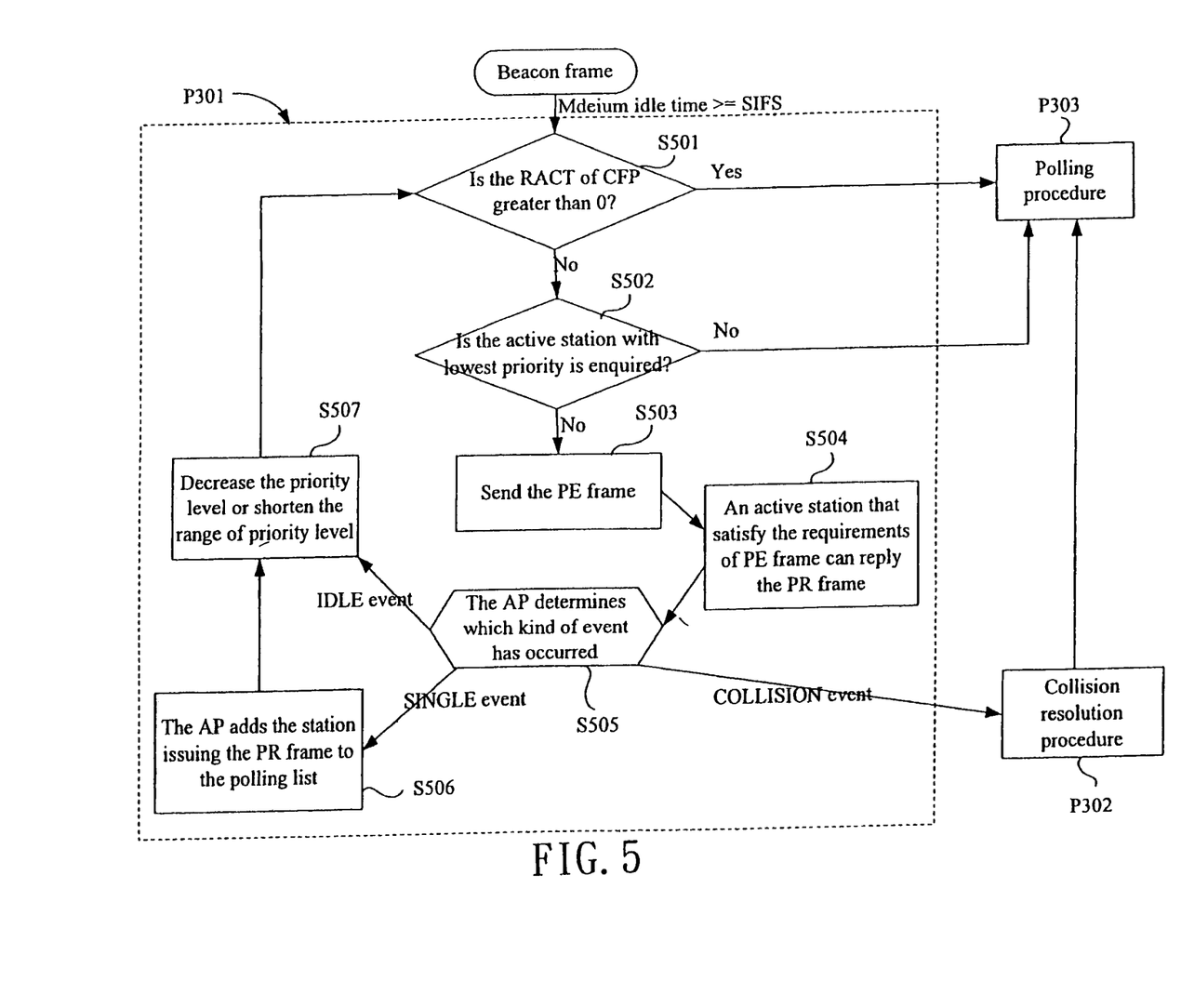
FIG. 5 is a flowchart of FIG. 4 according to an embodiment of the invention.
Figure 10:
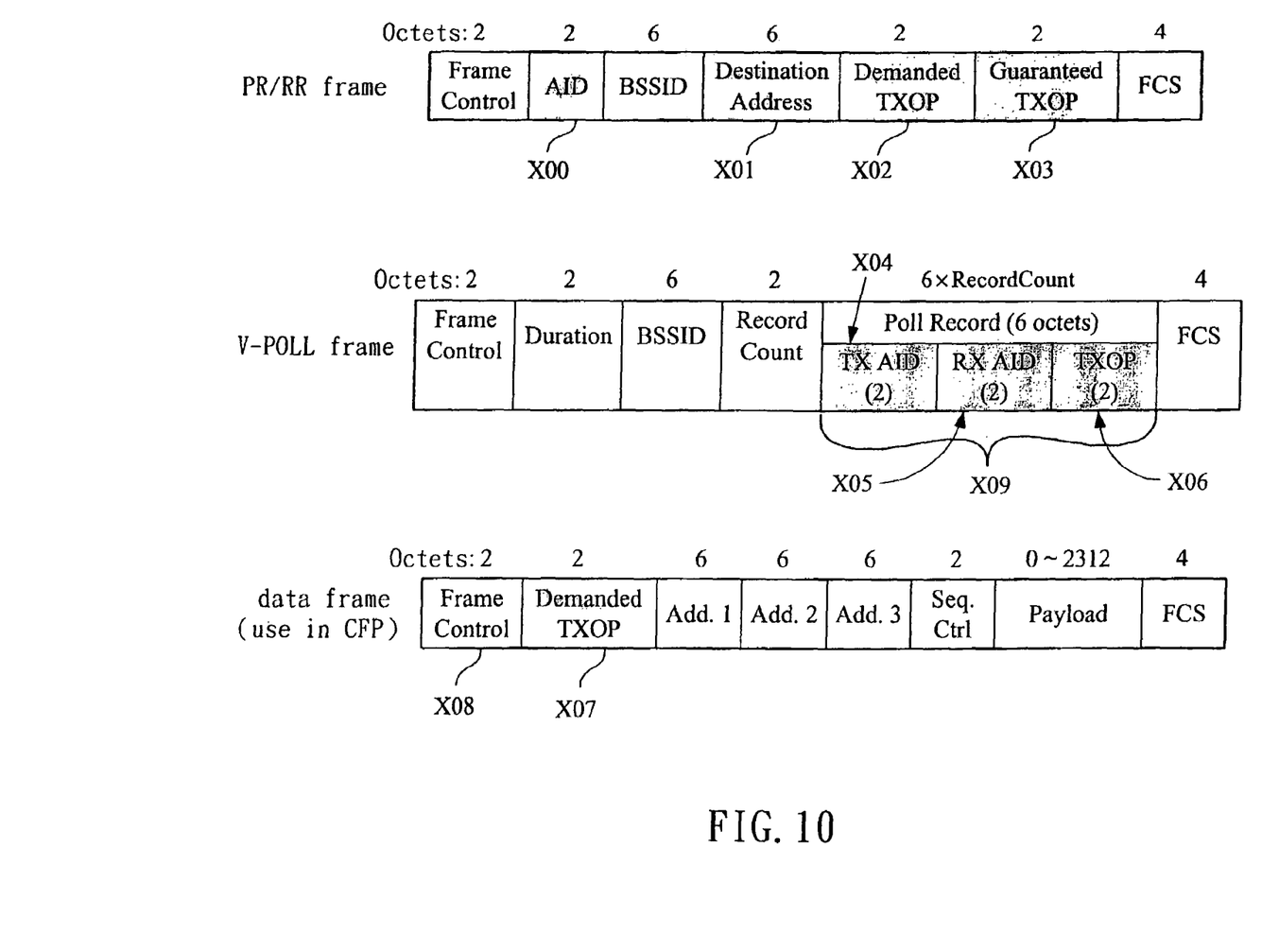
FIG. 10 is an example of frame formats according to an embodiment of the invention.

FIG. 4 is an example of a prioritization procedure according to an embodiment of the invention. FIG. 5 is a flowchart of FIG. 4 according to an embodiment of the invention. Referring to FIGS. 4 and 5, in the invention, priority levels are numbered from 0 to H, with H denoting the highest priority level. In FIG. 4, assume that H=3 and there are 16 mobile stations with the AIDs from zero to 15 (i.e., stations 0~15) in the BSS. In addition, assume that stations 4, 6, 10, and 13 are active stations, station 4 intends to send a flow with priority 2, and stations 6, 10, and 13 intend to send a flow with priority 1. After broadcasting a beacon frame, in step 503, the AP sends the PE$_3$ (priority enquiry) frame 401 to invite active stations whose priority equals 3 to reply the PR (priority response) frame. If the result of the current handshake is IDLE (i.e. no one replies), then in step S507, the AP proceeds to the next handshake by issuing the PE$_2$ frame after an elapsed PIFS. In step 504, assume that only station 4 replies the priority response (PR) frame 403, wherein the PR frame should contain at least the sender AID X00 and the MAC address of its intended receiver X01, as shown in FIG. 10. Once the AP correctly receives this PR frame 403, then in step S506, the AP adds that station (station 4) in the polling list. In step S507, the AP next probes which active stations with priority 1 want to join the polling list. In step 504, if stations 6, 10, 13 reply the PR frames 405, 406, 407 at the same time, the AP will detect the COLLISION event. Then the AP sends the registration enquiry (RE) frame 405 to announce the start of the collision resolution procedure P302.

In the collision resolution period, the AP performs the collision resolution procedure. FIG. 6 is a schematic graph of a tree-splitting algorithm according to an embodiment of the invention. FIG. 7 is an example of a collision resolution procedure according to an embodiment of the invention. From FIG. 4, it is found that the close of the prioritization period results from the transmission of multiple PR frames with priority 1. Then the AP executes the collision resolution procedure P302 to identify the active stations (stations 6, 10, and 13) which bring the COLLISION event in the prioritization period. In step S610, the AP sends the RE frame to ask active stations with their AIDs in the address pattern range of {*1} to reply the registration response (RR) frame, wherein {*1} indicates a binary set containing {0001, 0011, 0101, 0111, 1001, 1011, 1101, 1111} and * means "don't care." In event E602, only station 13 (1101 in binary) replies the RR frame 702, station 13 is thus successfully added in the polling list, wherein the RR frame should contain at least the sender AID X00 and the MAC address of its intended receiver X01, as shown in FIG. 10. Next, in step S611, the AP sends out the RE frame with address pattern={*0}, asking for responses. Since both the AIDs of stations 6 and 10 belong to {*0}, then they reply, and their replies collide. Thus, the AP reduces the address pattern range to a half as {00}. This time, the AP will discover an IDLE event (E603). However, it may be pointless for the AP in step 613 to further probe the range of {10} since it is predictable to have a COLLISION event. Continuing in this manner (steps S614 and S615), the AP will discover the stations which bring the COLLISION in the prioritization period in bounded time. From FIG. 7, it is found that stations 13, 10, and 6 join the polling list at time T731, T732 and T733, respectively.

Multimedia flows are in general classified into two types: constant bit rate (CBR) and variable bit rate (VBR). A station of transmitting VBR flow may require a different TXOP value in every contention-free period. Hence, in the invention, during the registration period, each active station informs the AP the value of gTXOP and the value of dTXOP needed in the current CFP.

Referring to FIG. 10, active station can use the PR or RR frame to inform the AP the value of gTXOP X03 and the value of dTXOP in the current CFP. Besides, once an active station joins the polling list, that station can piggyback the dTXOP value required in the next polling period with the data frame X07.

Figure 8:
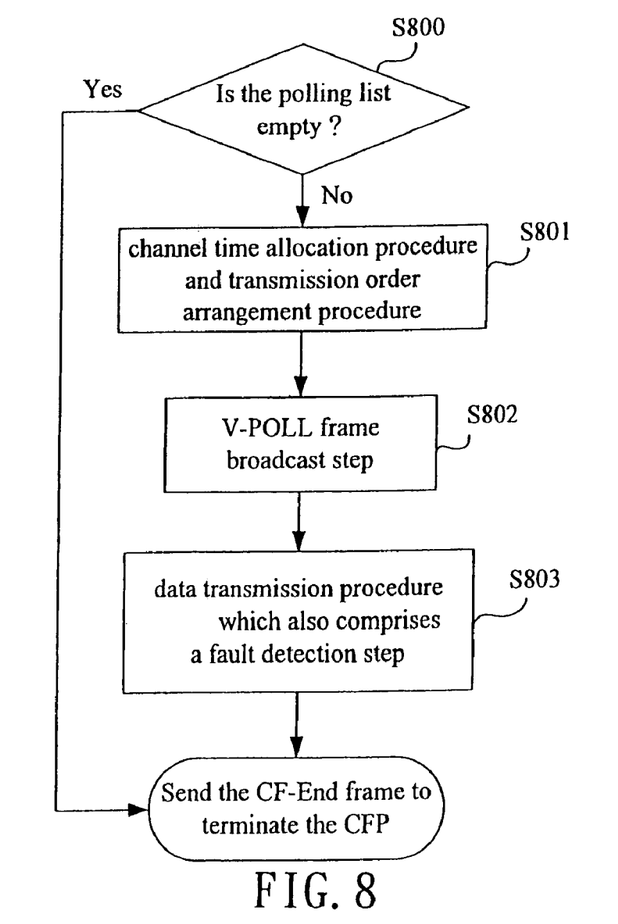
FIG. 8 is a flowchart of a polling procedure according to an embodiment of the invention.
Figure 9:
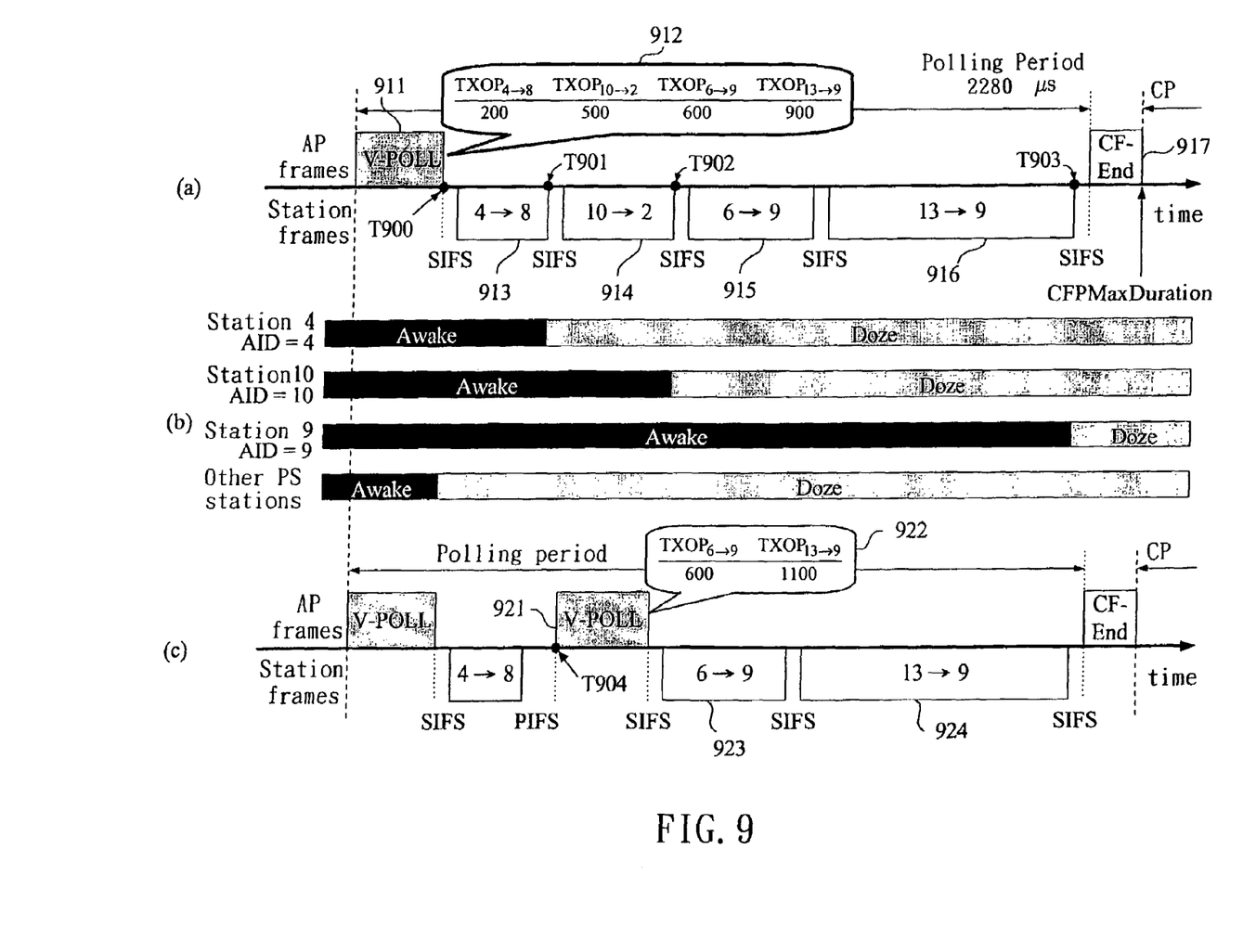
FIG. 9 is an example of FIG. 8 according to an embodiment of the invention.

Once the collision resolution period concludes, the AP performs the polling procedure P303. FIG. 8 is a flowchart of a polling procedure according to an embodiment of the invention. FIG. 9 is an example of FIG. 8. Referring to FIGS. 8 and 9, suppose that stations 4, 13, 10, 6 announce (dTXOP_4=200 us, gTXOP_4=200 us), (dTXOP_13=1100 us, gTXOP_13=700 us), (dTXOP_10=600 us, gTXOP_10=400 us), (dTXOP_6=600 us, gTXOP_6=900 us) respectively, wherein dTXOP_Ai denotes the dTXOP of the station with AID=Ai (station Ai), gTXOP_Ai denotes the gTXOP of station Ai, and "us" is $10^{-6}$ seconds. At the beginning of the polling procedure, the AP executes the channel time allocation procedure and the transmission order arrangement procedure (S801). Specifically, in channel time allocation procedure, the AP allocates the TXOP value for each yet-to-be-polled station according to its declared gTXOP and dTXOP. Before broadcasting the V-POLL frame 911, the AP first computes the remaining available channel time in the CFP (see FIG. 9(a), the remaining available channel time is 2280 us). After assigning the default TXOP (min{dTXOP_Ai, gTXOP_Ai}) to each admitted station, say Ai, the AP can allocate the additionally unused CFP channel time (300 us, in this example) to the stations whose dTXOP is greater than gTXOP according to the weighted fair sharing scheme. Thus, the TXOP of station 10 is $$400 + (2200 - 200 - 700 - 400 - 600) \times \frac{(600 - 400)}{(600 - 400) + (1100 - 700)} = 500 \text{ us}$$

and the TXOP of station 13 is $$700 + 300 \times \frac{400}{400 + 200} = 900 \text{ us}.$$

To minimize the average time that the polled station spends in the awake state, the AP can the transmission order for yet-to-be-polled stations. Therefore, in step S801, the AP schedules the transmission order for each yet-to-be-polled power-saving station, based on the total time required in transmitting and receiving during the polling period, in an increasing order. From FIG. 9, it can be found that the transmission order 912 of polled stations is station 4→station 10→station 6→station 13 since the TXOP values of stations 4, 10, 6, 13 are 200 us, 500 us, 600 us, and 900 us, respectively.

Referring to FIGS. 8 and 9, once the step S801 (the channel time allocation procedure and the transmission order arrangement procedure) is complete, the AP then performs the V-POLL frame broadcast step S802. The AP announces the transmission order and the TXOP for each polled station via the V-POLL frame 911. Referring to FIG. 10, the V-POLL frame contains a vector list and each vector X09 is composed of at least: (1) the AID of a polled station X04, (2) its intended receiver X05, and (3) the granted TXOP X06, wherein each vector is corresponding to an admitted flow. Each polled station needs to keep track of the channel activity and automatically initiates its transmission a SIFS period after the end of the transmission of its predecessor in the polling order. To conserve energy, a PS station that will be either a sender or a receiver may remain in the awake state for only a portion of the polling period through the time that the PS station finishes sending or receiving data frames. For example, in FIG. 9, station 4 can return to the doze state at time T901, station 10 can return to the doze state at time T902, and station 9 can return to the doze state at time T903. Other stations (i.e. stations 0, 1, 3, 5, 7, 11, 12, 14, and 15) can return to the doze state at time T900 since their AIDs do not appear in the V-POLL frame. In step S803, once an admitted station finishes sending its flow and desires to terminate the connection, it can set the More Data bit to zero in the Frame Control filed X08. When the AP receives this information, it will remove that station from the polling list.

Referring again to FIGS. 8 and 9, the data transmission procedure further comprises a fault detection step S803. In step S803, when the AP does not receive a response from station 10 after an elapsed PIFS, it resends the V-POLL frame 921 to announce the newly calculated TXOP values to the remaining members on polling list. Stations 6 and 13, in this example, then send data frames 923 and 924 according to the indication 922 of the new V-POLL frame 921. If a polled station does not respond to the V-POLL frame for K consecutive contention-free periods, then the AP may remove that station from the polling list, wherein K is an integer defined by the AP.

Since the length of CFP is limited (no more than CFPMaxDuration), the overrun of the registration process may shorten the polling period, thus violating the default TXOP (min{dTXOP, gTXOP}) promised for each admitted station. The present invention integrates the admission control into the registration procedure such that the AP can determine when the registration period should be terminated.

Referring again to FIGS. 3-5 and 7 (P301, P302), the AP can periodically announce the RACT via the priority enquiry frames (401, 402, and 404) or via the registration enquiry frames (701, 703, 706, 708, and 710). An active station, say Aj, whose dTXOP is greater than RACT can either adjust (dTXOP_Aj or gTXOP_Aj) or abort the contention in the remaining registration period and wait for the next CFP.

The above specification, examples, and data provide a complete description of the implementations and use of the composition of the invention. Since many other possible modifications and variations of the invention can be made without departing from the spirit and scope of the invention, the invention resides in the claims hereinafter appended.

What is claimed is:

1. A medium access control (MAC) method for applications with power conservation and quality-of-service requirements in a basic service set (BSS) of a wireless local area network (WLAN), comprising:
   an optional registration procedure, which is coordinated by a access point (AP) to ensure that active stations can join a polling list from higher priority to lower priority; and
   a mandatory polling procedure, which is coordinated by the AP to ensure that each polled station can transmit data frames according to a transmission opportunity (TXOP) and transmission order announced in a vector-list poll (V-POLL) frame;
   wherein the MAC method is used in a contention-free period (CFP), wherein a BSS consists of the AP and a finite number of mobile stations, wherein a mobile station can be either in the active mode or in the power saving (PS) mode, wherein the AP broadcasts the V-POLL frame, and wherein the registration procedure is performed during a registration period and the polling procedure is performed during a polling period; wherein the registration procedure comprises a prioritization procedure and a collision resolution procedure; during the registration period, the AP performs the polling procedure once the AP recognizes that the overrun of the registration process violates the default TXOP value promised to any admitted station; in the prioritization period, the AP performs the polling procedure when the AP has already enquired active stations with the lowest priority; during the prioritization period, the AP performs the collision resolution procedure once the AP detects a COLLISION event, wherein the collision resolution procedure is executed in a form of handshaking to thus add one or more active stations into the polling list.

2. The MAC method of claim 1, wherein the prioritization procedure comprises:
   (a) the AP broadcasting the priority enquiry frame, from higher priority to lower priority, to mobile stations within the BSS, wherein a priority enquiry (PE) frame includes at least a priority value or a possible range of priority values; and
   (b) if an active station has a data frame or flow with a priority value either no less than that in the PE frame or belonging to the priority range in the PE frame, then that active station can send the priority response (PR) frame to the AP, wherein the PR frame includes at least the identifier of that active station, which is selected from the MAC address, association ID (AID), and other identifiable coding.

3. The prioritization procedure of claim 2, wherein according to the PR frame, the AP will perform one of the following two steps:
   (c) if the AP did not receive any PR frame (IDLE event), then the AP decreases the priority value or shortens the priority range, and next performs the step (a);
   (d) if the AP correctly received one PR frame (SINGLE event), then the AP adds the active station of that PR frame to the polling list, and next the AP decreases the priority value or shortens the priority range, and next performs the step (a);
   (e) if two or more active stations replied PR frames to the AP (COLLISION event), then the AP starts to perform the collision resolution procedure.

4. The MAC method of claim 1, wherein the collision resolution procedure uses a tree-splitting algorithm to identify active stations that bring the COLLISION event during the prioritization period, comprising:
   a registration enquiry step: the AP broadcasts a registration enquiry (RE) frame to stations within the BSS, wherein the RE frame includes at least an address pattern; and
   a registration response step: if an active station whose identifier belongs to the address pattern in the RE frame, then the active station sends the registration response (RR) frame to the AP, wherein the RR frame includes at least the identifier of that active station.

5. The MAC method of claim 1, wherein during the registration period, each active station can propose its demanded TXOP (dTXOP) in a current polling period and a required guaranteed TXOP (gTXOP) during the connection lifetime; further, each polled station can piggyback a dTXOP value required in the next polling period with the data frame.

6. The MAC method of claim 1, wherein during the registration period, the AP periodically announces the RACT (remaining available channel time) of the contention-free period; the active station whose default TXOP (the minimum of dTXOP and gTXOP) is greater than RACT can either adjust its dTXOP or gTXOP, or abort the contention in the remaining registration period and wait for the next CFP.

7. The MAC method of claim 1, wherein the polling procedure further comprises:
   a channel time allocation procedure: the AP allocates a TXOP value for each yet-to-be-polled station;
   a transmission order arrangement procedure: the AP arranges the transmission order for each yet-to-be-polled station;
   a V-POLL frame broadcast step: the AP broadcasts the V-POLL frame to stations within the BSS, wherein the V-POLL frame contains a vector list and each vector is composed of a yet-to-be-polled station, its intended receiver, and a granted TXOP; and
   a data transmission procedure; all polled stations sequentially transmit data frames according to the indication of the V-POLL frame.

8. The MAC method of claim 1, wherein a power saving (PS) station wakes up at the start of the contention-free period and stays in the awake state; on inspecting the V-POLL frame, a PS station that can neither transmit nor receive data frames during the polling period returns to the doze state.

9. The MAC method of claim 7, wherein the data transmission procedure further comprises:
   a fault detection step: when the AP detects that a polled station does not respond to the V-POLL frame, the AP then resends the new V-POLL frame containing the remaining un-transmitted stations on the polling list.

10. The MAC method of claim 7, wherein in the channel time allocation procedure, the AP allocates a TXOP value for each admitted station according to its dTXOP and gTXOP.

11. The MAC method of claim 7, wherein in the transmission order arrangement procedure: the AP schedules the transmission order for each yet-to-be-polled power-saving station, based on the total time required in transmitting and receiving during the polling period, in an increasing order.

12. The MAC method of claim 7, wherein in the data transmission procedure, if an admitted station desires to leave the polling list, then that station can piggyback a leave information with the data frame to notify the AP; when the AP receives the leave information, it can remove that station from the polling list.

13. The MAC method of claim 9, in the fault detection step, if a polled station does not respond to the V-POLL frame for K consecutive contention-free periods, then the AP removes the station from the polling list, wherein K is an integer defined by the AP.

* * * * *